(12) United States Patent
Fuchigami

(10) Patent No.: US 7,236,266 B2
(45) Date of Patent: Jun. 26, 2007

(54) IMAGE PROCESSING APPARATUS AND IMAGE PROCESSING METHOD

(75) Inventor: Takahiro Fuchigami, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 896 days.

(21) Appl. No.: 10/348,772

(22) Filed: Jan. 23, 2003

(65) Prior Publication Data

US 2005/0088695 A1 Apr. 28, 2005

(51) Int. Cl.
*G06F 15/00* (2006.01)
(52) U.S. Cl. ....................................................... 358/1.9
(58) Field of Classification Search ................. 358/1.9, 358/3.06, 2.1, 462, 3.28, 3.22; 382/260, 382/167, 266
See application file for complete search history.

(56) References Cited

U.S. PATENT DOCUMENTS

| | | | | |
|---|---|---|---|---|
| 6,912,069 | B1* | 6/2005 | Matsunoshita | 358/3.28 |
| 2002/0071131 | A1* | 6/2002 | Nishida | 358/1.9 |
| 2002/0159106 | A1 | 10/2002 | Fuchigami et al. | |

FOREIGN PATENT DOCUMENTS

JP 11-55505 A 2/1999

\* cited by examiner

*Primary Examiner*—King Y. Poon
*Assistant Examiner*—Saeid Ebrahimi
(74) *Attorney, Agent, or Firm*—Foley & Lardner LLP

(57) ABSTRACT

An image-area discrimination section in an image processing apparatus improves the accuracy of white-ground-region discrimination by more minutely classifying brightnesses with an edge discrimination section and a combination of the edge discrimination section and a contrast discrimination section.

17 Claims, 10 Drawing Sheets

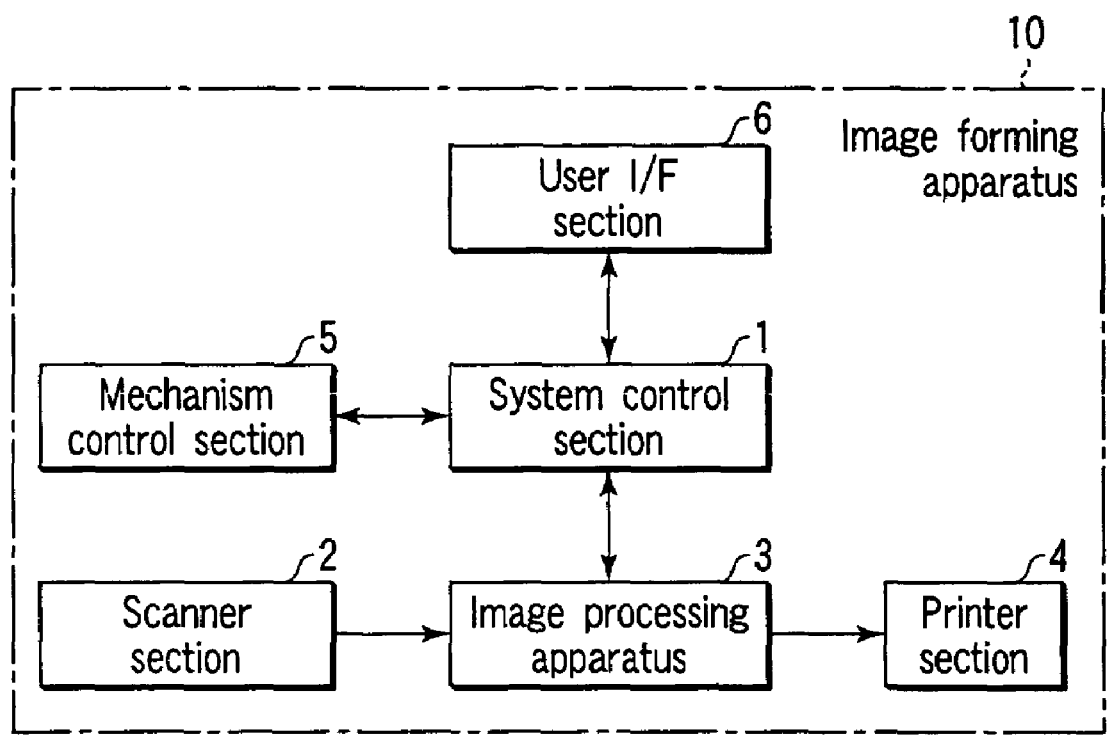
F I G. 1

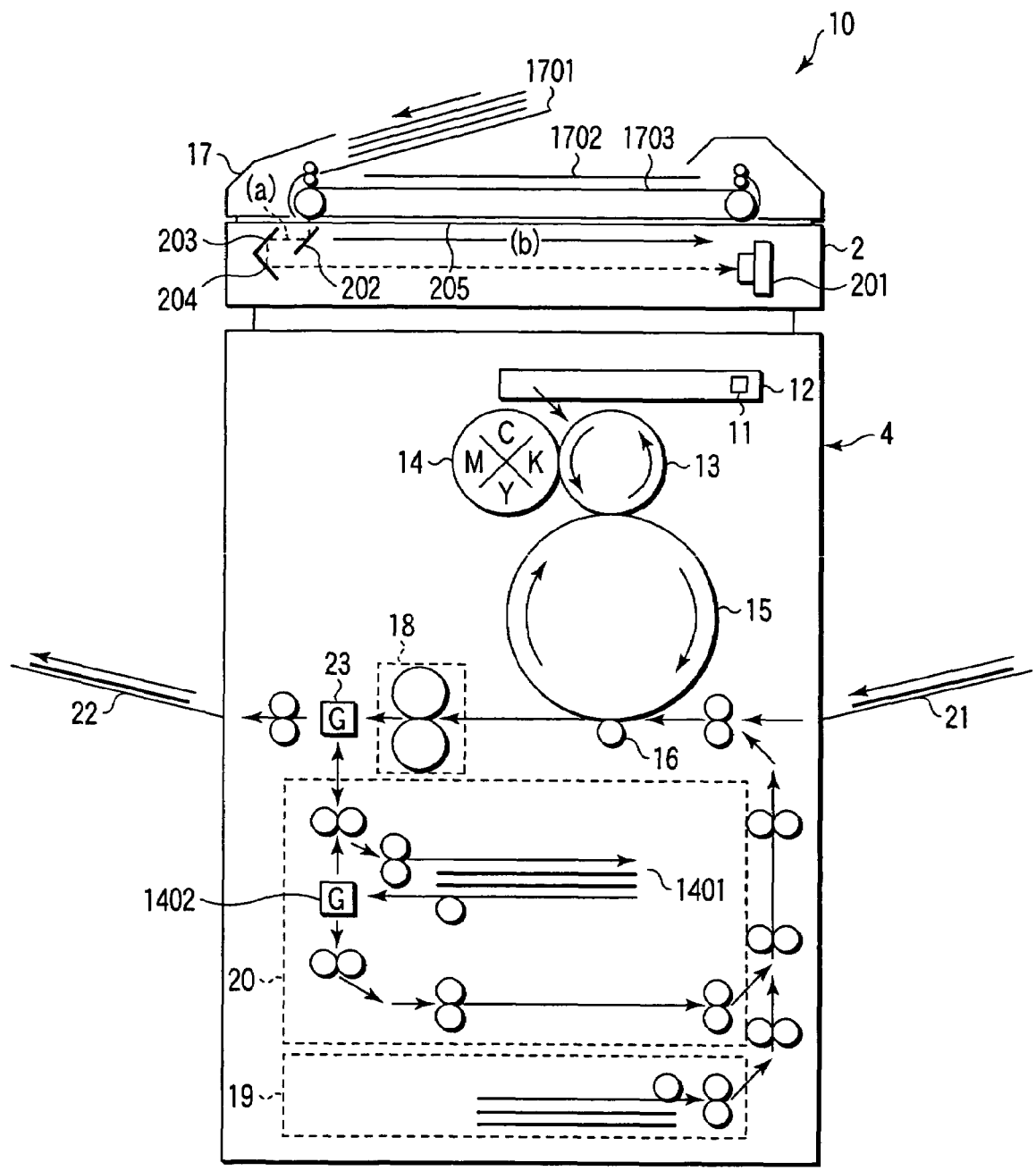
F I G. 2

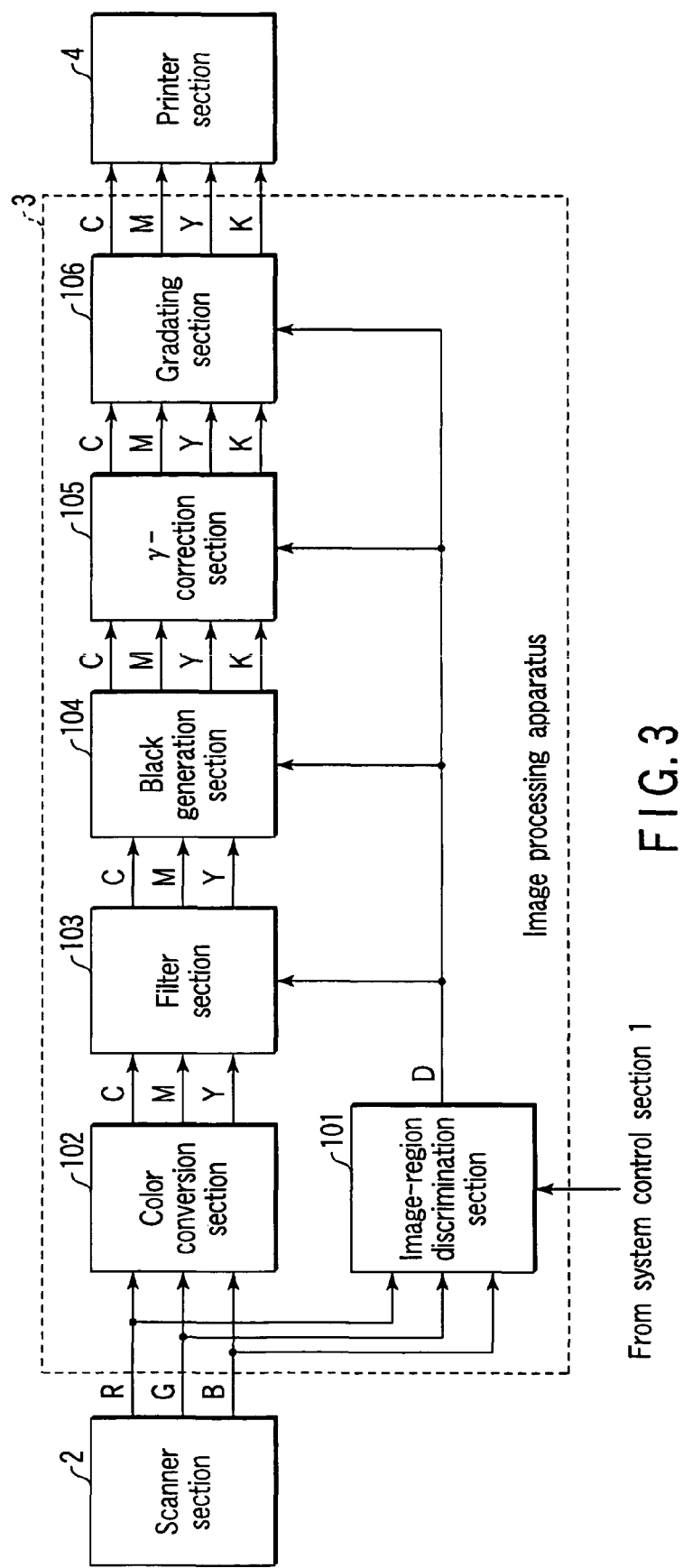
F I G. 3

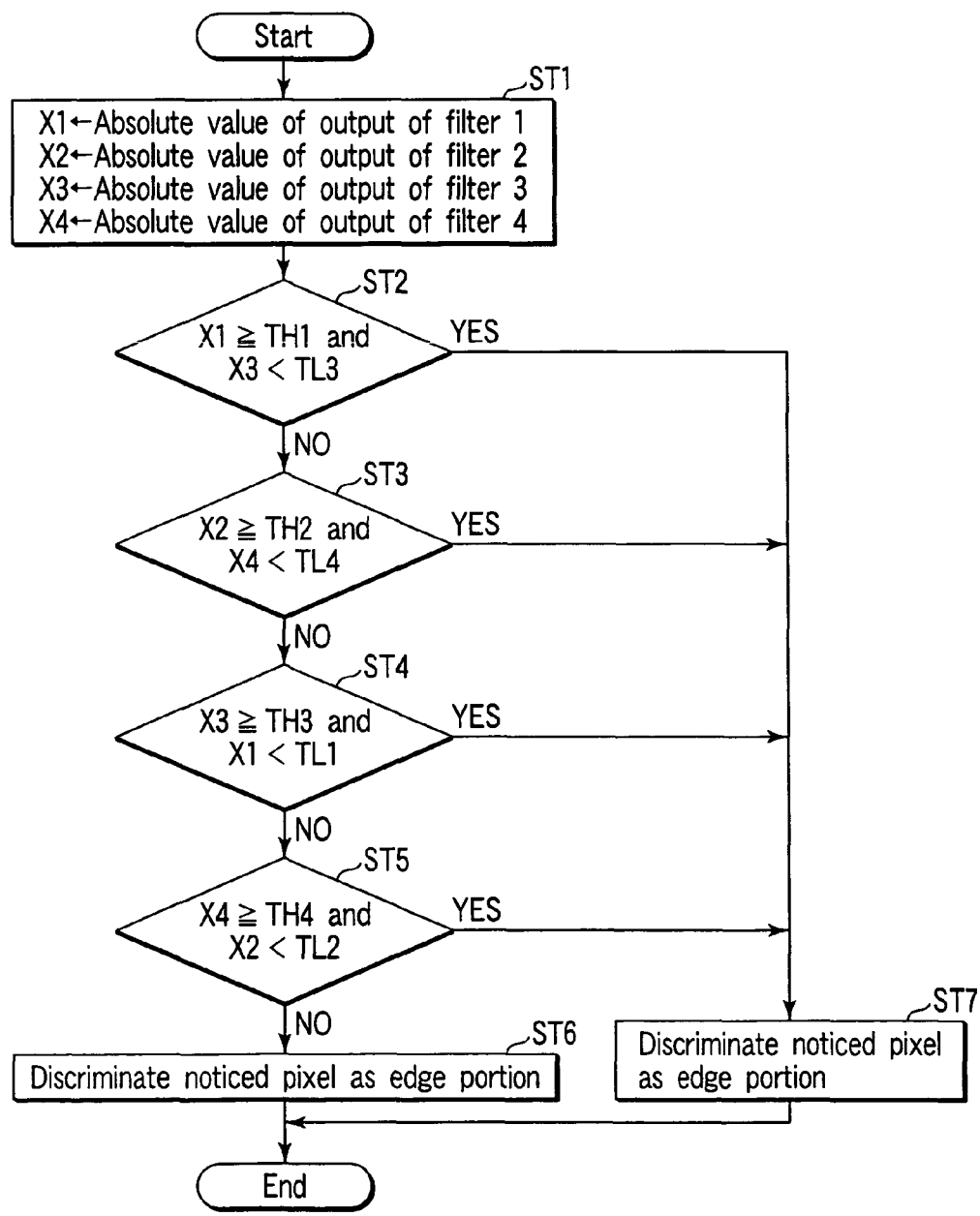

Input image
(Character on white background)

Brightness signal profile

Input image
(Halftone dot)

Brightness signal profile

IMAGE PROCESSING APPARATUS AND IMAGE PROCESSING METHOD

BACKGROUND OF THE INVENTION

The present invention relates to an image processing apparatus and an image processing method for performing image processing on a color image input to a digital color copying machine for reading a color image from a document and forming a copy image.

To detect a character/line-work portion from a document image input to the above image processing apparatus, the apparatus discriminates whether or not each local image area is an area where characters are written on a white background.

A conventional image processing apparatus discriminates a white background area only through brightness classification or its spatial distribution, independently of an edge portion or halftone-dot portion. This art is disclosed in Jpn. Pat. Appln. KOKAI Publication No. 11-55505.

However, an intermediate brightness occurs at a character contour portion even in an area where characters are written in a white background area and a high brightness or low brightness occurs at the maximum point or minimum point of a halftone dot even in a half-tone image area. Therefore, there is a problem that the discrimination accuracy of a white background area is not improved by only classifying brightnesses in accordance with threshold values.

BRIEF SUMMARY OF THE INVENTION

It is an object of the present invention to provide an image processing apparatus and an image processing method capable of improving the accuracy for discriminating a white background area by more minutely classifying brightnesses.

To achieve the above object, the present invention provides an image processing apparatus for processing a plurality of input color image signals, comprising an edge discrimination section which discriminates whether or not the pixel of each of the above input image signals is an edge portion; a brightness classification section which classifies brightness values of pixels of the input image signals by comparing the brightness values with a predetermined threshold value; a pixel counting section which counts the number of noticed pixel in accordance with a discrimination result by the edge discrimination section and a classification result by the brightness classification section in a predetermined peripheral area; and a white-ground discrimination section which discriminates that the noticed pixel is included in a white background area when the number of pixels counted by the pixel counting section is smaller than a predetermined threshold value.

The present invention provides an image processing method for processing a plurality of input color image signals, comprising: discriminating whether or not pixels of the input image signals are edge portions; classifying brightness values of pixels of the input image signals by comparing the brightness values with a predetermined threshold value; counting the number of noticed pixel in accordance with the discrimination result and the classification result in a predetermined area; and discriminating that the noticed pixel is included in a white background area when the counted number of pixels is smaller than a predetermined threshold value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is an illustration showing a schematic configuration of an image forming apparatus including an image processing apparatus of the present invention;

FIG. 2 is an illustration schematically showing an internal configuration of an image forming apparatus;

FIG. 3 is an illustration schematically showing a configuration of an image processing apparatus;

FIG. 5 is an illustration showing an example of counting by an edge detecting filter;

FIG. 6 is an illustration showing a counting example by an edge detecting filter;

FIG. 7 is an illustration showing a counting example by an edge detecting filter;

FIG. 8 is an illustration showing a counting example by an edge detecting filter;

FIG. 9 is a flowchart for explaining processing operations of an edge discrimination section;

DETAILED DESCRIPTION OF THE INVENTION

Figure 4:
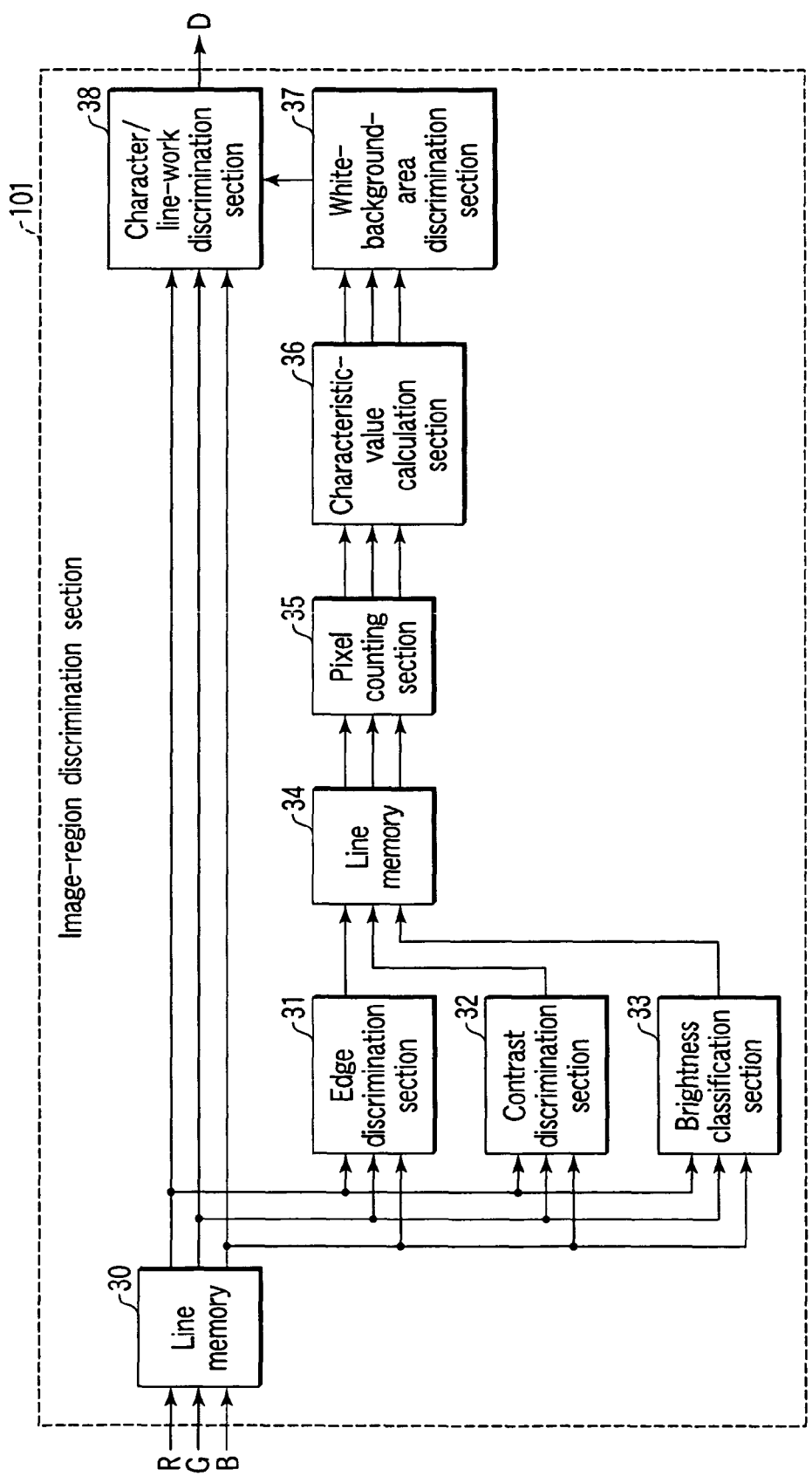
FIG. 4 is a block diagram showing a detailed configuration of an image-area discrimination section.

An embodiment of the present invention is described below by referring to the accompanying drawings.

FIG. 1 shows a schematic configuration of an image forming apparatus 10 including an image processing apparatus of the present invention.

That is, the image forming apparatus 10 is configured by a system control section 1, a scanner section 2, an image processing apparatus 3, a printer section 4, a mechanism control section 5, and a user I/F section 6.

The system control section 1 controls the whole system.

The scanner section 2 scans a document while irradiating the document with a light source to read an image by a 3-line color CCD sensor to be described later in accordance with the light reflected from the document.

The image processing apparatus 3 applies processes such as γ correction, color conversion, main scanning and power varying, image separation, working, area processing, and gradation correction to the image data read by the scanner section 2.

The printer section 4 forms an image in accordance with the image data supplied from the image processing section 3.

The mechanism control section 5 controls configurations of units configuring the present apparatus.

In the case of the user I/F section 6, a user inputs the operation setting of this apparatus and displays a setting screen.

FIG. 2 schematically shows the internal configuration of the image forming apparatus 10. The image forming apparatus 10 is configured by the scanner section 2 and printer section 4.

A document placement plate 205 (document reading plate) made of transparent glass on which a reading object or a document will be placed is set on the upper face of the scanner section 2. Moreover, an automatic document feeder 205 (ADF) for automatically feeding a document onto the document placement plate 17 is installed on the upper face of the scanner section 2. The automatic document feeder 17 is installed on the document placement plate 205 so that it can be opened or closed and also functions as a document holder for bringing a document mounted on the document placement plate 205 into close contact with the document placement plate 205.

The scanner section 2 is configured by a 3-line color CCD sensor 201 for reading colors R (red), G (green), and B (blue) of a document image every line, and a first mirror 202, second mirror 203, and third mirror 204 for leading a line image on a document to the 3-line color CCD sensor 201, and a light source (not shown in the figure) set in the proximity of the first mirror to obtain the light reflected from a document reading line.

The printer section 4 is configured by an image write section 12 having a laser diode (LD) 11, a photo-conductor drum 13, a development section 14 for adhering and actualizing toners of various colors, an intermediate transfer section 15 for retransferring an image formed on the photo-conductor drum 13 onto a transfer belt, a transfer section 16 for transferring an image formed on the photo-conductor drum 13 to a transfer sheet, a fixing section 18 having a fixing roller and pressure roller to perform thermal fixing, a sheet feed section 19 for feeding transfer sheets, an automatic double-face unit (ADU) 20, a manual sheet feed section 21, a sheet ejection section 22, and a carrying-route change gate 23.

The automatic document feeder 17 is configured by a document placement plate 1701, document ejecting stand 1702, and document feed belt 1703. A document is installed on the document placement plate 1701 and the document on the document placement plate 1701 is automatically fed or ejected by the document feed belt 1703. The document is ejected to the document ejecting stand 1702.

Image forming operations of the image forming apparatus 10 in the above configuration are described below by referring to FIGS. 1 and 2.

The system control section 1 controls the whole of the image forming apparatus 10.

First, a document is scanned while being irradiated with a not-illustrated light source, the light reflected from the document is received by the 3-line color CCD sensor 201, and the image data for the document is sent to the image processing section 3.

The image processing section 3 applies image processes such as γ correction, color conversion, main scanning and power varying, image separation, working, area processing, and gradation correction to the sent image data and transmits the data to the printer section 4.

The printer section 4 drives the LD 11 and modulates the LD 11 in accordance with the transmitted image data.

The photo-conductor drum 13 is uniformly electrified, and then a latent image is written in the drum 13 by a laser beam emitted from the LD 11, toner is adhered to the image by the development section 14, and the image is actualized.

The image formed on the photo-conductor drum 13 is retransferred onto the intermediate transfer belt of the intermediate transfer section 15. In the case of a full color copy, toners of four colors (black, cyan, magenta, and yellow) are successively superimposed on the intermediate transfer belt of the intermediate transfer section 15.

In the case of full color, when steps of forming and transferring a four-color image are completed, a sheet is fed from the sheet feed section 19 (or manual sheet feed tray 21) at the same timing as the intermediate transfer belt of the intermediate transfer section 15 and toners of four colors are simultaneously transferred to the sheet from the intermediate transfer belt of the intermediate transfer section 15 by the transfer section 16.

In the case of monochromatic copy, toner of one color (black) is transferred onto the transfer belt from the photo-conductor drum 13. When steps of forming and transferring an image are completed in the same manner as that of full color, a sheet is fed from the sheet feed section 19 (or manual sheet feed tray 21) at the same timing as the intermediate transfer belt of the intermediate transfer section 15 and toners are transferred to the sheet from the intermediate transfer belt of the intermediate transfer section 15 by the transfer section 16.

The transfer sheet to which toner is transferred is sent to the fixing section 18 through the carrying route, thermally fixed by the fixing roller and pressure roller, and ejected to the sheet ejection section 22.

Moreover, setting of a copy mode or the like by a user is input from the user I/F section 6. An operation mode such as the set copy mode is sent to the system control section 1.

The system control section 1 performs control for executing the set copy mode. In this case, the system control section 1 provides a control instruction for the scanner section 2, image processing section 3, printer section 4, mechanism control section 5, and user I/F section 6. Moreover, the system control section 1 provides a control instruction for such units as the automatic double-face unit 20 and automatic sheet feeder 17 as shown in FIG. 2.

FIG. 3 schematically shows a configuration of the image processing apparatus 3. The image processing apparatus 3 is configured by an image-area discrimination section 101, a color conversion section 102, a filter section 103, a black generation section 104, a γ-correction section 105, and gradating section 106.

The image processing apparatus 3 discriminates a character/line-work portion of an image signal input from the scanner section 2, enhances the portion, and outputs the portion to the printer section 4.

The scanner section 2 optically reads a document put on the document placement plate 205 by a line sensor of three primary colors, executes A/D conversion and range correction, and generates image signals for R (red), G (green), and B (blue).

The R, G, and B image signals generated by the scanner section 2 are input to the image-area discrimination section 101 and color converting section 102.

The image-area discrimination section 101 discriminates character/line-work on each pixel of a document image by using input image signals of R, G, and B. Details will be described later.

The color conversion section 102 converts input image signals of R, G, and B into color signals of cyan (C), magenta (M), and Y (yellow) which are color components for forming an image every pixel by the printer section 4. The color signals of C, M, and Y output from the color conversion section 102 are sent to the filter section 103.

The filter section 103 filters input color signals of C, M, and Y in order to improve the visibility of an image by raising the gain of a specific frequency band. However, because a photo portion configured by halftone dots causes the moire which emphasizes the frequency of a halftone dot, filter characteristics are changed in accordance with a result of the above image area discrimination. Color signals of C, M, and Y output from the filter section 103 are sent to the black generation section 104.

The black generation section 104 generates a black-component signal (K) from color signals of C, M, and Y output from the filter section 103 in order to improve the reproducibility of a black character or shadow portion in the printer section 4. As the black generation processing, a method is well known which uses a value obtained by multiplying the minimum value of three colors of C, M, and Y by a predetermined value Z ($0 \leq Z \leq 1$) as the value of K and a value obtained by subtracting K from values of C, M, and Y as new values of C, M, and Y.

$$K = Z \times \min(C, M, Y)$$

$$C' = C - K$$

$$M' = M - K$$

$$Y' = Y - K$$

Moreover, the processing of assuming the average value of three colors C, M, and Y as the value of K and setting values of C, M, and Y to zero is applied to a black character/black line-work portion in a white background area as shown by the following expression.

$$K = (C + M + Y)/3$$

$$C' = M' = Y' = 0$$

The γ-correction section 105 converts a color signal value into an ink amount by using a conversion table for each color in order to absorb the difference between the gradation characteristic of color signals of C, M, Y, and K and the image-forming gradation characteristic of the printer section 4. In this case, a conversion table for further enhancing contrast is used for a character/line-work portion in order to improve the visibility.

The gradating section 106 performs dithering for artificially gradation reproduction (area modulation) by using a predetermined number of pixels when the number of gradations when the printer section 4 forms an image is smaller than the number of gradations of color signals. For example, when outputting color signals of 256 gradations by a two-gradation printer, it is theoretically possible to reproduce 256 gradations (actually, 257 gradations) by using 16×16 pixels. However, when simply applying area modulation to a character/line-work portion, an edge structure breaks. To preserve the edge structure, a pixel discriminated as character/line-work is simply binarized to reproduce gradations by using only pixels other than the above pixel.

The printer section 4 forms an image by transferring an ink amount based on color signals of C, M, Y, and K output from the image processing apparatus 3 to a sheet.

Next, the image-area discrimination section 101 is described below.

FIG. 4 shows an example of a detailed configuration of the image-area discrimination section 101 of the present invention. That is, the image-area discrimination section 101 is configured by line memories 30 and 34, an edge discrimination section 31, a contrast discrimination section 32, a brightness classification section 33, a pixel counting section 35, a characteristic-value calculation section 36, a white-ground-region discrimination section 37, and a character/line-work discrimination section 38.

The line memory 30 is an FIFO (first-in first-out) memory for holding image signals of R, G, and B in order to simultaneously refer to a plurality of lines.

The edge discrimination section 31 discriminates whether or not a brightness change is present only in a certain direction by referring to the peripheral area of each noticed pixel.

The contrast discrimination section 32 detects the maximum brightness difference in the peripheral area of each noticed pixel.

The brightness classification section 33 compares brightness values of noticed pixel with a predetermined threshold value and classifies the values into a plurality of categories.

The line memory 34 is the FIFO memory for holding processing results by the edge discrimination section 31 and contrast discrimination section 32 in order to simultaneously refer to a plurality of lines.

The pixel counting section 35 counts the number of noticed pixel by referring to processing results held by the line memory 34. A processing example by the pixel counting section 35 will be also described later.

The characteristic-value calculation section 36 performs the processing of multiplying the number of pixels for each category counted by the pixel counting section 35 by a predetermined coefficient corresponding to a category and adding multiplication results. In this case, it is possible to use a positive or negative coefficient.

The white-ground-region discrimination section 37 discriminates whether or not a noticed pixel is included in a white background area by comparing a characteristic value calculated by the characteristic value calculation section 36 with a predetermined threshold value. In the case of the above discrimination, the relationship between a counting method by the pixel counting section 35 and a coefficient selection method by the characteristic-value calculation section 36 is important. Details of processing contents will be described later.

The character/line-work discrimination section 38 discriminates whether or not each noticed pixel is processed as character/line-work by the image processing apparatus 3. As a simple example, a method is used in which signal values of R, G, and B are binarized in accordance with a predetermined threshold value only on pixels discriminated as noticed pixel included in a white background area by the white-ground-region discrimination section 37. Moreover, it is possible to perform character/line-work discrimination by analyzing a more complex image structure also in an area other than the white background area.

Next, the edge discrimination section 31 is described below.

FIGS. 5, 6, 7, and 8 show coefficient examples of edge detection filters corresponding to four directions. FIG. 5 is filter 1, FIG. 6 is filter 2, FIG. 7 is filter 3, and FIG. 8 is filter 4. Using the edge detection filters, the brightness values of pixels arranged by referring to the noticed pixel as their center are multiplied by the coefficients to obtain values, and these values are then added together.

The edge discrimination section 31 discriminates whether or not a brightness change in a certain direction is present by pairing output values of the edge detection filters orthogonal to each other and comparing them with a predetermined value.

Processing operations of the edge discrimination section 31 are described below by referring to the flowchart in FIG. 9.

First, the edge discrimination section 31 refers to peripheral area of noticed pixel to calculate the absolute value X1 of the output of the filter 1 shown in FIG. 5, the absolute value X2 of the output of the filter 2 shown in FIG. 6, the absolute value X3 of the output of the filter 3 shown in FIG. 7, and the absolute value X4 of the output of the filter 4 shown in FIG. 8 (ST1).

Then, the edge discrimination section 31 confirms whether or not the absolute value X1, a threshold value TH1, the absolute value X3, and a threshold value TL3 have relations of X1≧TH1 and X3<TL3 (ST2). When the confirmation result is "NO", the section 31 starts the next step.

The edge discrimination section 31 confirms whether or not the absolute value X2, a threshold value TH2, the absolute value X4, and a threshold value TL4 have relations of X2≧TH2 and X4<TL4 (ST3). When the confirmation result is "NO", the section 31 starts the next step.

The edge discrimination section 31 confirms whether or not the absolute value X3, a threshold value TH3, the absolute value X1, and a threshold value TL1 have relations of X3≧TH3 and X1<TL1 (ST4). When the confirmation result is "NO", the section 31 starts the next step.

The edge discrimination section 31 confirms whether or not the absolute value X4, a threshold value TH4, the absolute value X2, and a threshold value TL2 have relations of X4≧TH4 and X2<TL2 (ST5). When the confirmation result is "NO", the section 31 discriminates the noticed pixel as non-edge portion (ST6).

When confirmation results are "YES" in steps ST2, ST3, ST4, and ST5, the edge discrimination section 31 discriminates the noticed pixel as edge portion (ST7).

The edge discrimination section 31 performs the above processes on colors of R, G, and B and discriminates whether the noticed pixel is edge portions or non-edge portions by calculating the logical sum of these processing results.

Figure 10:
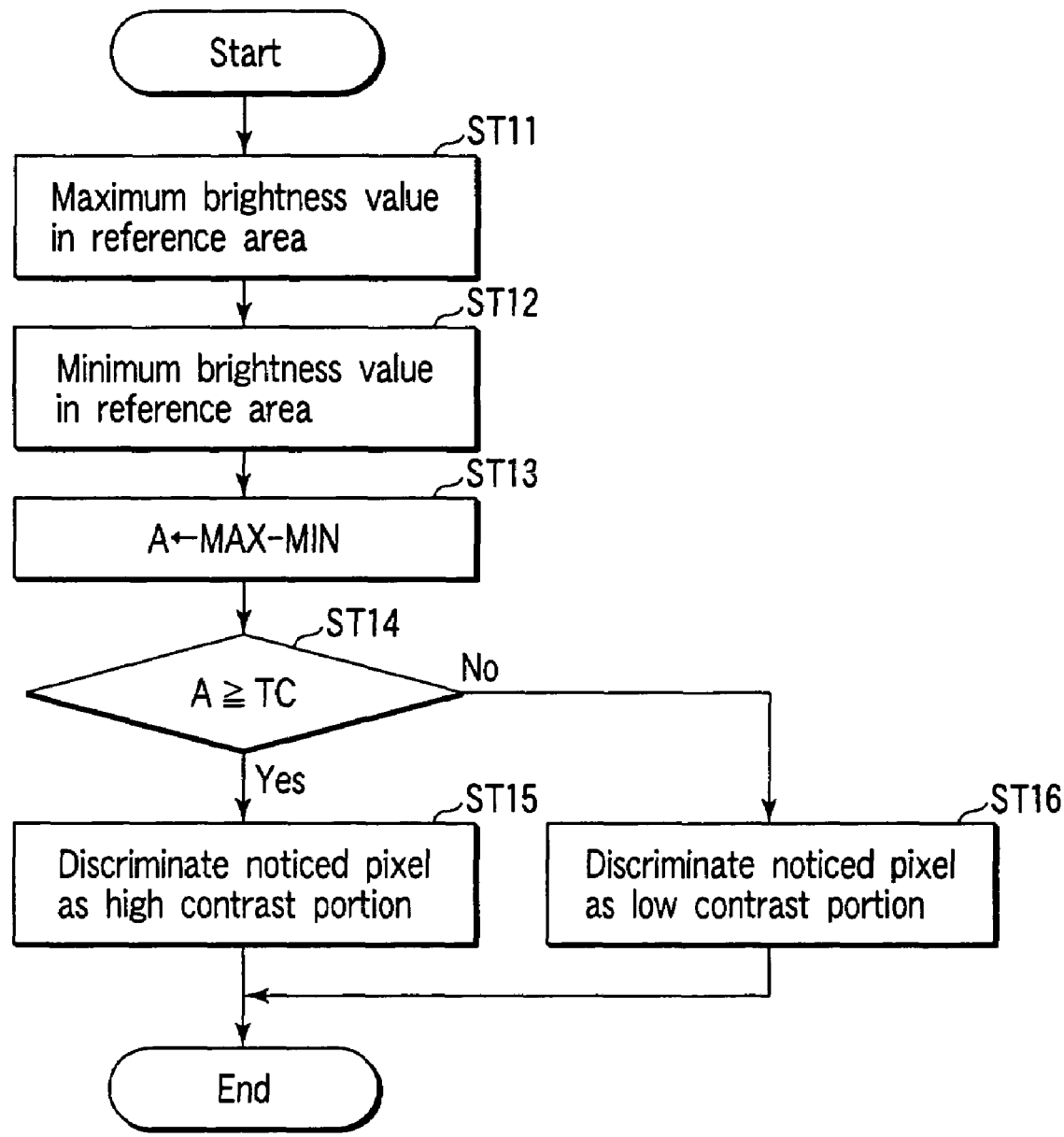
FIG. 10 is a flowchart for explaining processing operations of a contrast discrimination section.

Next, processing operations by the contrast discrimination section 32 are described below by referring to the flowchart in FIG. 10.

First, the contrast discrimination section 32 extracts the maximum brightness value MAX in a reference area (peripheral area of noticed pixel) (ST11) and extracts the minimum brightness value MIN in the reference area (peripheral area of noticed pixel) (ST12).

The contrast discrimination section 32 obtains the maximum brightness difference A which is the difference between the extracted maximum brightness value MAX and minimum brightness value MIN (ST13).

The contrast discrimination section 32 confirms whether or not the obtained maximum brightness difference A and a threshold value TC have a relation of A≧TC (ST14).

When the confirmation result is "YES", the contrast discrimination section 32 discriminates the noticed pixel as high-contrast portion (ST15). When the confirmation result is "NO", the section 32 discriminates the noticed pixel as low-contrast portion (ST16).

The contrast discrimination section 32 performs the above processing on colors of R, G, and B and discriminates whether the noticed pixel is high-contrast portions or low-contrast portions by calculating the logical sum of results of the processes.

Figure 11:
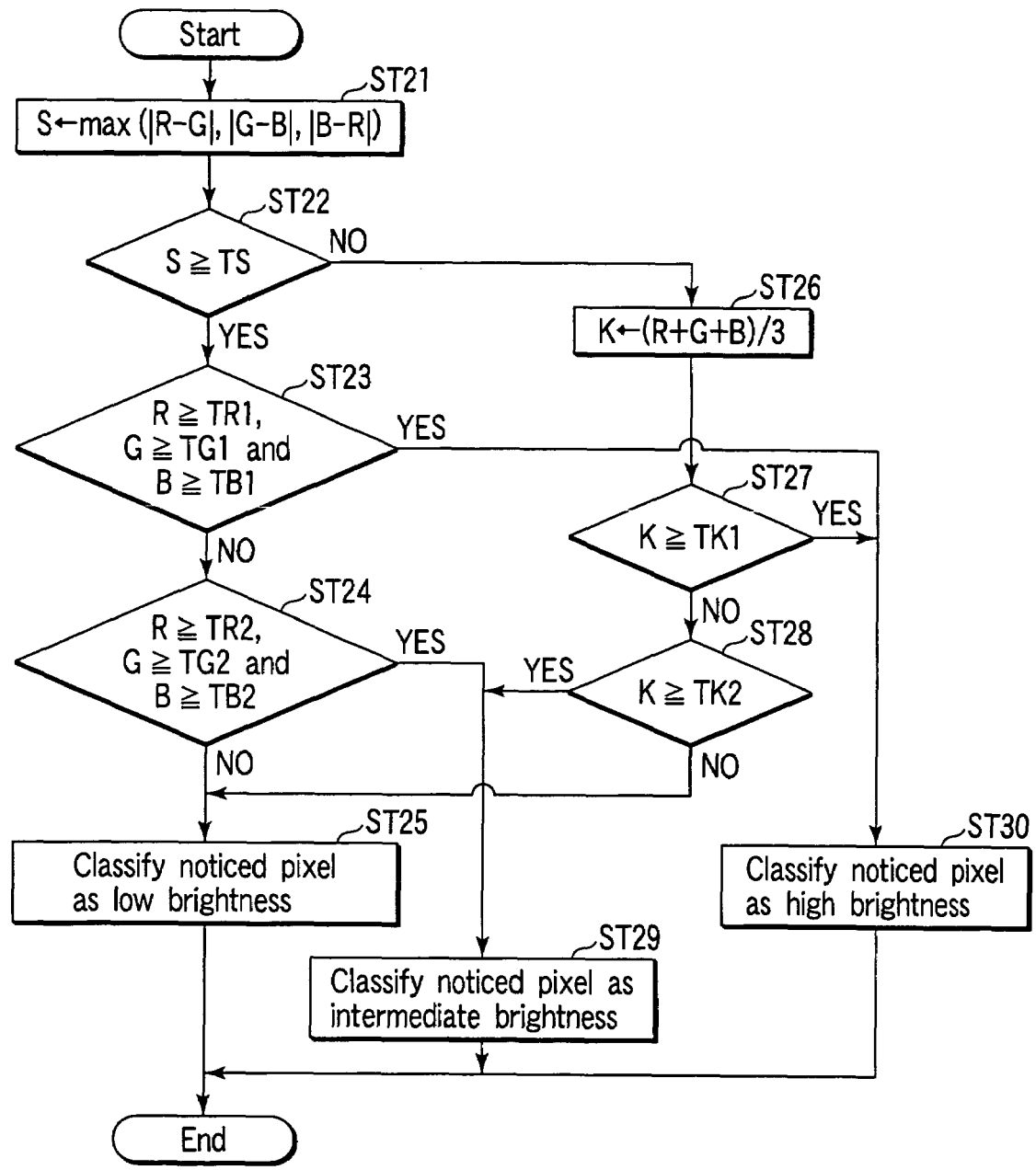
FIG. 11 is a flowchart for explaining processing operations of a brightness classification section.

Then, processing operations of the brightness classification section 33 are described below by referring to the flowchart in FIG. 11.

First, the brightness classification section 33 calculates max (|R-G|, |G-B|, |B=R|) and assumes it as "S" (ST21).

Then, the brightness classification section 33 confirms whether or not the calculated "S" and the threshold value TS have a relation of S≧TS (ST22).

When the result is "YES" in step ST22, the brightness classification section 33 assumes that the threshold value of R is TR1, the threshold value of G as TG1, and the threshold value of B as TB1 to compare whether or not relations of R≧TR1, G≧TG1, and B≧TB1 are effectuated (ST23).

When the confirmation result is "YES", the brightness classification section 33 classifies the noticed pixel as high brightness (ST30).

However, when the confirmation result is "NO" in step ST23, the brightness classification section 33 assumes that the threshold value of R as TR2, the threshold value of G as TG2, and the threshold value of B as TB2 to compare whether or not relations of R≧TR2, G≧TG2, and B≧TB2 are effectuated (ST24).

When the confirmation result is "NO", the brightness classification section 33 classifies the noticed pixel as low brightness (ST25). When the confirmation result is "YES", the section 33 classifies the noticed pixel as intermediate brightness (ST29).

Moreover, when the confirmation result is "NO" in step ST22, the brightness classification section 33 calculates (R+G+B)/3 to obtain the average value K (ST26).

The brightness classification section 33 confirms whether or not the obtained average value K and threshold value TK1 have a relation of K≧TK1 (ST27).

When the confirmation result is "YES", the brightness classification section 33 classifies the noticed pixel as high brightness (ST30).

When the confirmation result is "NO" in step ST27, the brightness classification section 33 confirms whether or not the average value K and threshold value TK2 have a relation of K≧TK2 (ST28).

When the confirmation result is "NO", the brightness classification section 33 classifies the noticed pixel as low brightness (ST25). When the confirmation result is "YES", the section 33 classifies the noticed pixel as intermediate brightness (ST29).

The above brightness classification section 33 obtains the difference between the maximum and minimum values of three colors of R, G, and B as chroma. However, the present invention is not limited to the above calculation method.

Moreover, it is allowed that the brightness classification section 33 compares brightness values of pixels with different predetermined threshold values in accordance with a discrimination result by the edge discrimination section 31 and classifies the brightnesses into one or more brightness categories.

Furthermore, it is allowed that the edge discrimination section 31 discriminates the brightnesses by a different discrimination method in accordance with a classification result by the brightness classification section.

Furthermore, the edge discrimination section 31 and brightness classification section 33 may be configured by hardware.

Next, the pixel counting section 35 is described.

Figure 12:
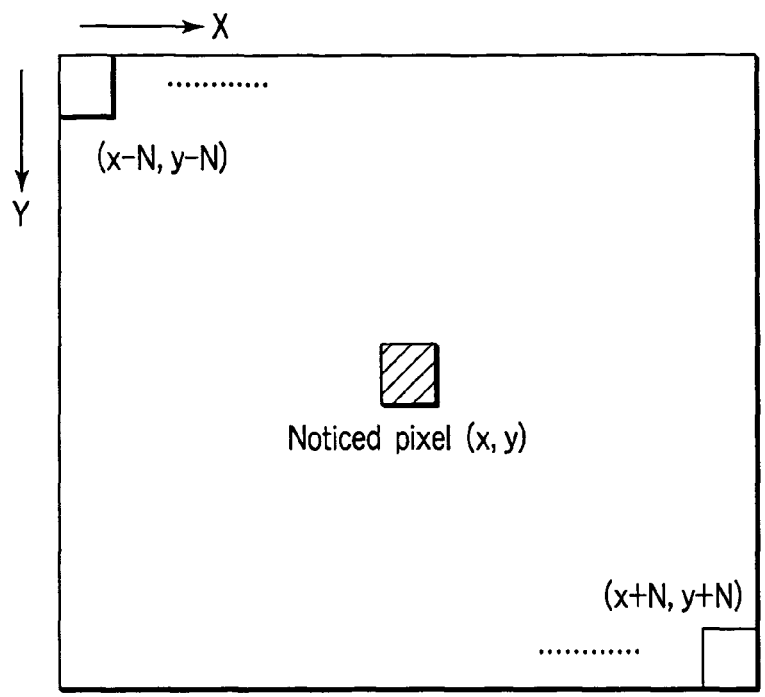
FIG. 12 is an illustration for explaining a referring range of an image counting section.

The pixel counting section 35 refers to "x" and "y" in the range of −N to +N respectively by assuming the coordinate in the main scanning direction of noticed pixel as "x" and the coordinate in the subscanning direction as "y" as shown in FIG. 12.

When the pixel counting section 35 of the present invention counts pixels, counting methods are changed according to factors such as edge/non-edge or high contrast/low contrast.

A first counting method is described below.

The first counting method does not count pixels discriminated as edges by the edge discrimination section 31 but it counts pixels discriminated as nonedges and discriminated as intermediate brightness by the brightness classification section 33.

A second counting method is described below.

The second counting method does not count pixels discriminated as edges by the edge discrimination section 31 but counts pixels discriminated as nonedges according to high brightness, intermediate brightness, or low brightness categories.

A third counting method is described below.

The third counting method counts pixels discriminated as nonedges by the edge discrimination section 31 according to high brightness, intermediate brightness, or low brightness categories by the brightness classification section 33. Moreover, pixels discriminated as edges by the edge discrimination section 31 are counted as being in the same category as that of low brightness.

A fourth counting method is described below.

The fourth counting method determines that pixels discriminated as nonedges by the edge discrimination section 31 and discriminated as high contrast by the contrast discrimination section 32 are included in a halftone-dot area. By using the above determination result, the edge discrimination section 31 counts pixels discriminated as nonedges by the edge discrimination section 31 categorized as halftone dots or nonhalftone dots. By counting pixels discriminated as halftone dots or nonhalftone dots or classified as high brightness, intermediate brightness, or low brightness by the brightness classification section 33, it is possible to perform more minute classification.

A fifth counting method is described below.

The fifth counting method counts pixels classified as intermediate brightness by the brightness classification section 33 and pixels discriminated as high contrast by the contrast discrimination section 32 among pixels discriminated as nonedges by the edge discrimination section 31.

A sixth counting method is described below.

The sixth counting method counts pixels discriminated as low contrast by the contrast discrimination section 32 among pixels discriminated as nonedges by the edge discrimination section 31 every category classified as high brightness, intermediate brightness, or low brightness. Moreover, pixels discriminated as high contrast by the contrast discrimination section 32 among pixels discriminated as nonedges by the edge discrimination section 31 are counted as being in the same category as the category classified as intermediate brightness.

A seventh counting method is described below.

The seventh counting method counts pixels discriminated as low contrast by the contrast discrimination section 32 among pixels discriminated as nonedges by the edge discrimination section 31 for categories of high brightness, intermediate brightness, or low brightness by the brightness classification section 33. Moreover, pixels discriminated as high contrast by the contrast discrimination section 32 among pixels discriminated as nonedges by the edge discrimination section 31 are counted as being in the same category as intermediate brightness. Furthermore, pixels discriminated as edges by the edge discrimination section 31 are counted as being in the same category as low brightness.

An eighth counting method is described below.

In the case of the eighth counting method, the system control section 1 first performs the control of comparing pixels with different predetermined threshold values by the brightness classification section 33 in accordance with a discrimination result by the edge discrimination section 31 and classifies them into one or more brightness categories. Pixels are counted according to the category classified by the brightness classification section 33.

A ninth counting method is described below.

In the case of the ninth counting method, the system control section 1 first performs control of comparing pixels with a predetermined threshold value and classifies them into one or more brightness categories by the brightness classification section 33, and performs different discriminations by the edge discrimination section 31 in accordance with the classification result of the brightness classification section 33. Pixels are counted for categories classified by the brightness classification section 33.

A tenth counting method is described below.

The tenth counting method counts pixels among pixels discriminated according to discrimination result of edge or nonedge by the edge discrimination section 31 and categories of high brightness, intermediate brightness, or low brightness by the brightness classification section 33.

An eleventh counting method is described below.

The eleventh counting method counts pixels among pixels discriminated as nonedges by the edge discrimination section 31 according to discrimination result of high contrast or low contrast by the contrast discrimination section 32 and category classified as high brightness, intermediate brightness, or low brightness by the contrast discrimination section 32.

The pixel counting by the pixel counting section 35 is described below by referring to the flowchart in FIG. 13.

Figure 13:
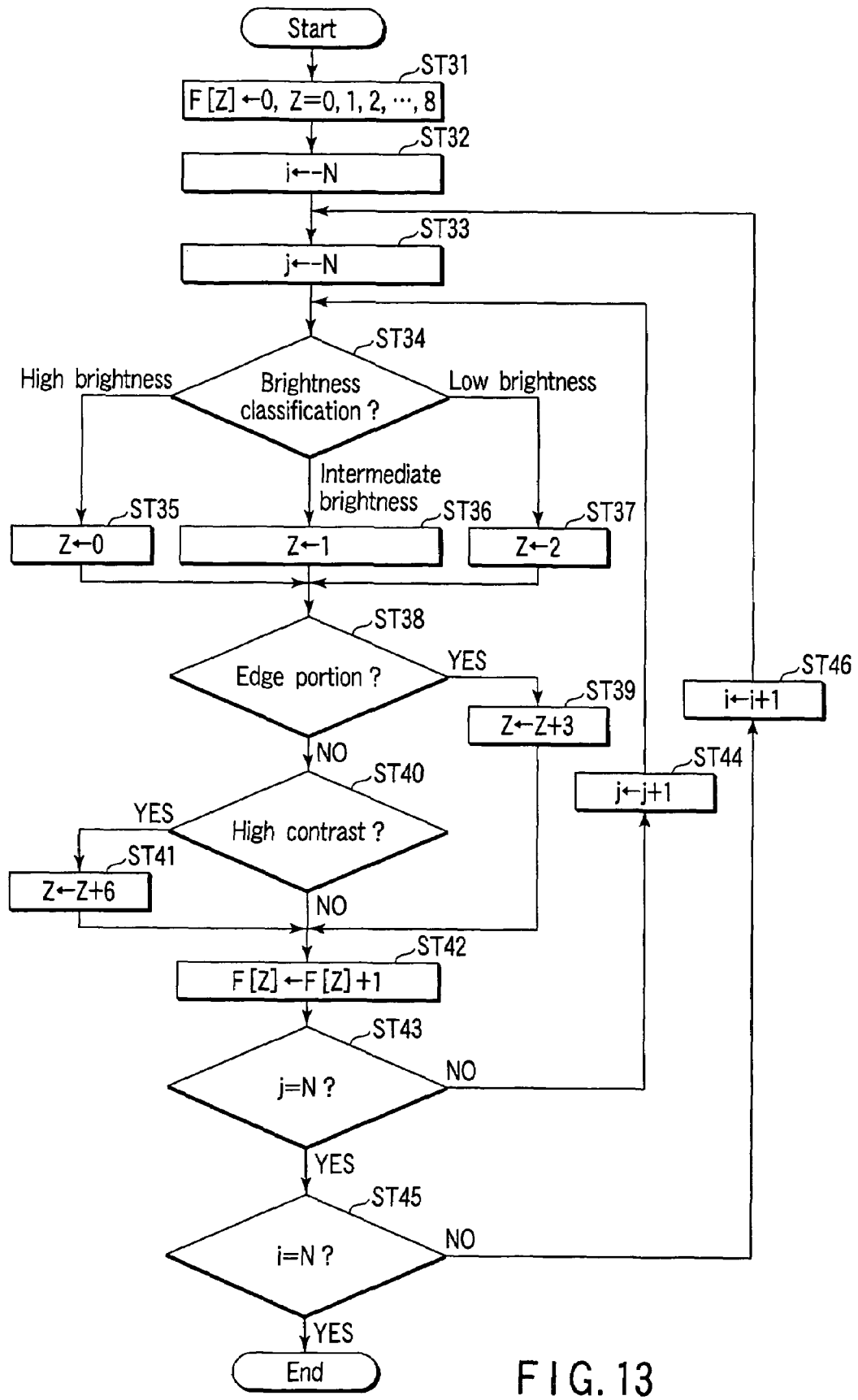
FIG. 13 is a flowchart for explaining processing operations of an image counting section.

First, in FIG. 13, "Z" denotes a number corresponding to a combination between results of brightness classification, edge discrimination, and high-contrast discrimination of noticed pixel. F[Z] denotes a counted value corresponding to the pixel category.

First, the pixel counting section 35 initializes F[0] to F[8] to "0" on the noticed pixel at the coordinates (x, y) (ST31), initializes an integer i to −N (ST32), and initializes an integer j to −N (ST33).

Then, the pixel counting section 35 substitutes "0" for "Z" at a high brightness in accordance with a brightness classification result of the reference pixel at the coordinates (x+i, y+i) (ST35), "1" for "Z" at an intermediate brightness (ST36), and "2" for "Z" at a low brightness (ST37).

The pixel counting section 35 discriminates whether or not the edge discrimination result of a reference pixel is an edge portion (ST38). When the reference pixel is an edge portion, the section 35 adds "3" to "Z" (ST39). However, when the reference pixel is not an edge portion, "Z" is kept at a value of 0 to 2 and the next step is started.

The pixel counting section 35 further discriminates whether or not a contrast discrimination result shows a high contrast portion on a reference pixel whose discrimination result does not show an edge portion (ST40). When the reference pixel is a high contrast portion, the section 35 adds "6" to "Z" (ST41).

That is, in the case of a reference pixel which is not an edge portion or high contrast portion, "Z" is kept at a value of 0 to 2. In the case of a reference pixel which is not an edge portion but which is a high contrast portion, "Z" is changed to a value of 6 to 8.

The pixel counting section 35 adds "1" to F[Z] corresponding to a decided value of "Z" (ST42) and determines whether or not the value of "j" reaches "N" (ST43). When the value does not reach N, the pixel counting section 35 adds "1" to "j" (ST44) and repeats processes from step ST34 downward.

When the value of "j" reaches "N", the pixel counting section 35 determines whether or not the value of "i" reaches "N" (ST45). When the value does not reach N, the pixel counting section 35 adds "1" to "i" (ST46) and repeats processes from step ST33 downward. Then, when the value of "i" reaches "N", the pixel counting section 35 completes counting.

In this case, giving a deep significance to values (0 to 8) of "Z" is performed as follows.

That is, when a brightness classification result shows a high brightness, Z is set to be 3 if an edge portion is discriminated through edge discrimination, Z is set to be 6 if a nonedge portion is discriminated through edge discrimination and is a high-contrast portion, and Z is set to be 0 if a nonedge portion is discriminated through edge discrimination and is a low contrast portion.

Moreover, when a brightness classification result shows an intermediate brightness, Z is set to be 4 if an edge portion is discriminated through edge discrimination, Z is set to be 7 if a nonedge portion is discriminated through edge discrimination and is a high contrast portion, and Z is set to be 1 if a nonedge portion is discriminated through edge discrimination and is a low contrast portion.

Furthermore, when a brightness classification result shows a low brightness, Z is set to be 5 if an edge portion is discriminated through edge discrimination, Z is set to be 8 if a nonedge portion is discriminated through edge discrimination and is a high contrast portion, and Z is set to be 2 if a nonedge portion is discriminated through edge discrimination and is a low contrast portion.

As described above, the present invention makes it possible not only to classify brightness values but also to change pixel counting methods in accordance with a factor such as edge/nonedge or high contrast/low contrast.

Figure 15:
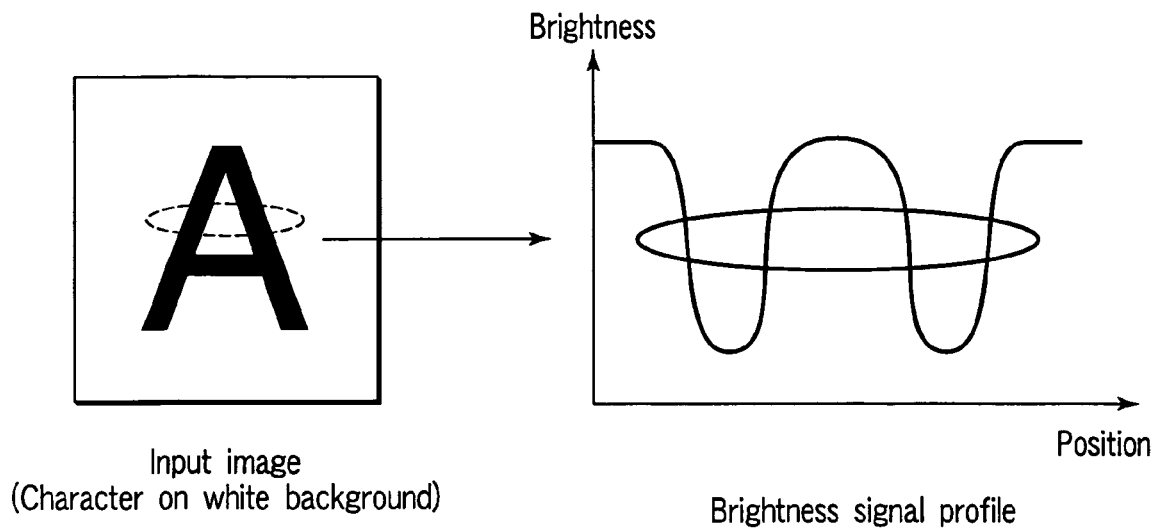
FIG. 15 is an illustration for explaining generation of an intermediate brightness in a character contour.
Figure 16:
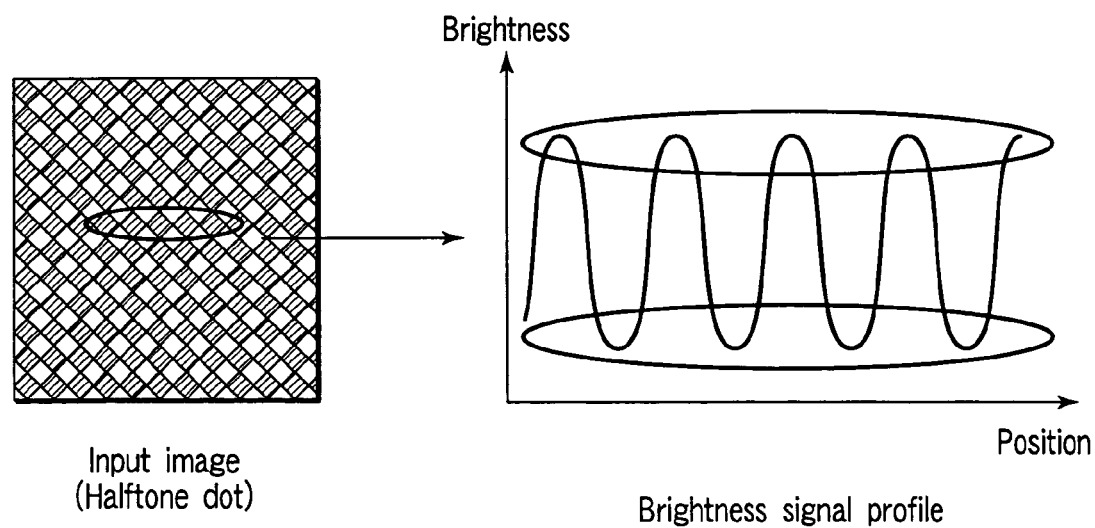
FIG. 16 is an illustration for explaining generation of high brightness and low brightness in a halftone-dot area.

Thereby, it is possible to correct a classification category when an intermediate-brightness pixel is generated by the contour of the character in the white background area shown in FIG. 15 or when a high-brightness or low-brightness pixel is generated at the maximum or minimum point of a brightness change in the halftone-dot area shown in FIG. 16.

Figure 14:
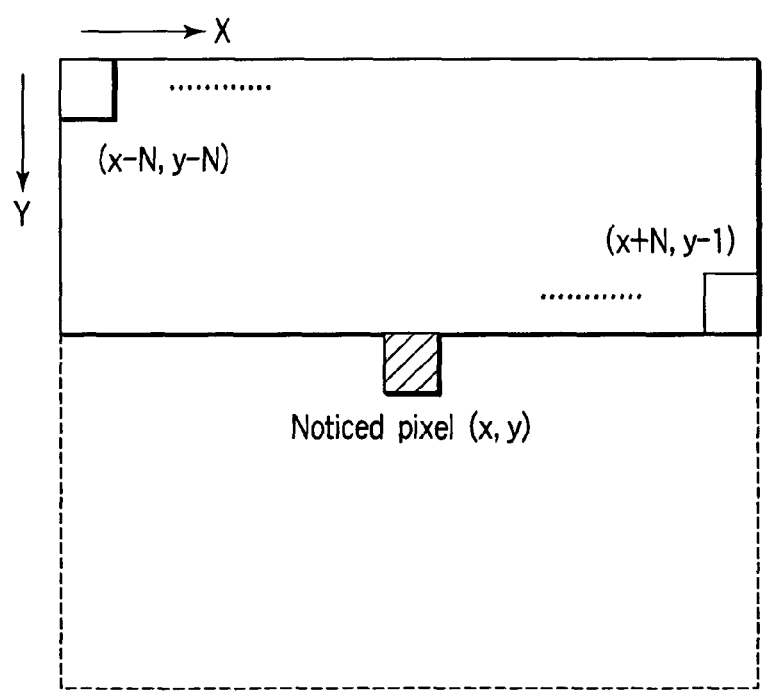
FIG. 14 is an illustration for explaining a referring range of an image counting section.

In the above description, a reference image area according to the pixel counting section 35 is shown in FIG. 12. However, it is also allowed to refer to "y" in the range of −N to −1 as shown in FIG. 14 in order to reduce the memory cost.

Next, a relation between characteristic value calculation and white background discrimination in the characteristic calculation section 36 and white-ground-region discrimination section 37.

By assuming the coefficient of an intermediate-brightness pixel as a negative value and that of a high-brightness pixel as a positive value and calculating the linear sum of the values in order to calculate a characteristic value, a white background area is discriminated when the characteristic value is larger than a predetermined threshold value.

However, by assuming the coefficient of an intermediate brightness as a positive value and that of a high-brightness pixel as a negative value, a white background area is discriminated when a characteristic value is smaller than a predetermined threshold value.

It is allowed that the characteristic-value calculation section 36 performs the linear combination operation on the above number of a plurality of types of pixels in the form of addition and subtraction of predetermined values corresponding to sequential categories on each noticed pixel.

Moreover, the characteristic-value calculation section 36 may decide predetermined values to be added or subtracted in accordance with the history of the classification category of a processed pixel on each noticed pixel in addition and subtraction corresponding to the above sequential category.

As described above, according to the above embodiment of the present invention, it is possible to more minutely classify brightnesses by an edge discrimination section or a combination of the edge discrimination section and a contrast discrimination section and improve the accuracy of white-ground-region discrimination.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for processing a plurality of input color image signals, comprising:
    an edge discrimination section which discriminates whether or not each pixel in each of the above input image signals is an edge portion;
    a brightness classification section which classifies brightness values of pixels in the input image signals by comparing the brightness values with a predetermined value;
    a pixel counting section which counts the number of noticed pixels in accordance with a discrimination result of the edge discrimination section and a classification result of the brightness classification section in a predetermined peripheral area; and
    a white-ground-region discrimination section which discriminates that the noticed pixel is included in a white background area by comparing the number of pixels counted by the pixel counting section with a predetermined threshold value,
    wherein the brightness classification section classifies pixels into three categories of high-brightness pixel, intermediate-brightness pixel, and low-brightness pixel by comparing brightness values of the pixels with two predetermined threshold values, and
    wherein the pixel counting section counts noticed pixel discriminated as nonedge portions by the edge discrimination section in a predetermined peripheral area and classified as intermediate-brightness pixels by the brightness classification section, and the white-ground discrimination section discriminates that the noticed pixel are included in a white background area when the counted number of pixels is smaller than a predetermined threshold value.

2. An image processing apparatus for processing a plurality of input color image signals, comprising:
   an edge discrimination section which discriminates whether or not each pixel in each of the above input image signals is an edge portion;
   a brightness classification section which classifies brightness values of pixels in the input image signals by comparing the brightness values with a predetermined value;
   a pixel counting section which counts the number of noticed pixels in accordance with a discrimination result of the edge discrimination section and a classification result of the brightness classification section in a predetermined peripheral area; and
   a white-ground-region discrimination section which discriminates that the noticed pixel is included in a white background area by comparing the number of pixels counted by the pixel counting section with a predetermined threshold value,
   wherein the pixel counting section counts pixels in peripheral area from (x–N, y–N) to (x+N, y+N) by assuming the coordinate in the main scanning direction of noticed pixel as "x" and the coordinate in the subscanning direction of the noticed pixel as "y".

3. An image processing apparatus for processing a plurality of input color image signals, comprising:
   an edge discrimination section which discriminates whether or not each pixel in each of the above input image signals is an edge portion;
   a brightness classification section which classifies brightness values of pixels in the input image signals by comparing the brightness values with a predetermined value;
   a pixel counting section which counts the number of noticed pixel in accordance with a discrimination result of the edge discrimination section and a classification result of the brightness classification section in a predetermined peripheral area; and
   a white-ground-region discrimination section which discriminates that the noticed pixel is included in a white background area by comparing the number of pixels counted by the pixel counting section with a predetermined threshold value,
   wherein the pixel counting section counts pixels in peripheral area from (x–N, y–N) to (x+N, y–1) by assuming the coordinate in the main scanning direction of noticed pixel as "x" and the coordinate in the subscanning direction of the noticed pixel as "y".

4. An image processing apparatus for processing a plurality of input color image signals, comprising:
   an edge discrimination section which discriminates whether or not each pixel in each of the input image signals is an edge portion;
   a brightness classification section which classifies pixels in the input image signals into three categories of high-brightness pixel, intermediate-brightness pixel, and low-brightness pixel by comparing brightness values of the pixels with two predetermined threshold values;
   a pixel counting section which counts noticed pixel discriminated as nonedge portions by the edge discrimination section in a predetermined peripheral area every category classified by the brightness classification section;
   a characteristic-value calculation section which calculates a characteristic value for showing white-ground-region likelihood of each noticed pixel in accordance with linear combination of the number of pixels every category counted by the pixel counting section; and
   a white-ground-region discrimination section which discriminates whether or not the noticed pixel is included in a white background area by comparing the characteristic value calculated by the characteristic-value calculation section with a predetermined threshold value.

5. The image processing apparatus according to claim 4, wherein the pixel counting section counts pixels discriminated as nonedge portions by the edge discrimination section in a predetermined peripheral area for each category classified by the brightness classification section, and counts pixels discriminated as edge portions by the edge discrimination section as being in the same category as the low-brightness pixel.

6. The image processing apparatus according to claim 4, wherein the characteristic-value calculation section performs addition and subtraction of predetermined values depending on a classified category on each noticed pixel.

7. The image processing apparatus according to claim 4, wherein the characteristic-value calculation section decides predetermined values to be added or subtracted in accordance with the history of the classification category of processed pixels.

8. The image processing apparatus according to claim 4, wherein the characteristic-value calculation section and white-ground-region discrimination section set the coefficient of a high-brightness pixel to a positive value and that of an intermediate-brightness pixel to a negative value and use the linear sum of the values as a characteristic value, discriminate a white background area when the characteristic value is larger than a predetermined threshold value while setting the coefficient of a high-brightness pixel to a negative value, that of an intermediate-brightness pixel to a positive value and using the linear sum of the values as a characteristic value, and discriminating a white background area when the characteristic value is smaller than the predetermined threshold value.

9. An image processing apparatus for processing a plurality of input color image signals, comprising:
   an edge discrimination section which discriminates whether or not each pixel in each of the input image signals is an edge portion;
   a brightness classification section which classifies pixels in the input image signals into three categories of high-brightness pixel, intermediate-brightness pixel, and low-brightness pixel by comparing brightness values of the pixels with two predetermined threshold values;
   a contrast discrimination section which discriminates whether or not pixels in the input image signals are high-contrast portions by comparing the maximum value of brightness differences of the pixels in predetermined peripheral area with a predetermined threshold value;
   a pixel counting section which counts pixels discriminated as intermediate-brightness pixels by the brightness classification section and pixels discriminated as high-contrast pixels discriminated by the contrast discrimination section among the noticed pixel discriminated as nonedge portions by the edge discrimination section in predetermined peripheral area; and a white-ground-region discrimination section which discriminates that the noticed pixel is included in a white background area when the number of pixels counted by the pixel counting section is smaller than a predetermined threshold value.

10. The image processing apparatus according to claim 9, wherein the pixel counting section has a halftone-dot-pixel discrimination section which discriminates that pixels discriminated as nonedge portions by the edge discrimination section and discriminated as high contrast by the contrast discrimination section are included in a halftone-dot area.

11. An image processing apparatus for processing a plurality of input color image signals, comprising:
an edge discrimination section which discriminates whether each pixel in each of the input image signals is an edge portion;
a brightness classification section which classifies pixels in the input image signals into three categories of high-brightness pixel, intermediate-brightness pixel, and low-brightness pixel by comparing brightness values of the pixels with two predetermined threshold values;
a contrast discrimination section which discriminates whether or not pixels in the input image signals are high-contrast portions by comparing the maximum value of brightness differences of the pixels in predetermined peripheral area with a predetermined threshold value;
a pixel counting section which counts noticed pixel for each category classified by the brightness classification section in accordance with a discrimination result by the edge discrimination section and a discrimination result by the contrast discrimination section in predetermined peripheral area;
a characteristic-value calculation section which calculates a characteristic value showing the white-ground-region likelihood of each noticed pixel through the linear combination of the number of pixels every category counted by the pixel counting section; and
a white-ground-region discrimination section which discriminates whether or not the noticed pixel is included in a white background area by comparing the characteristic value calculated by the characteristic-value calculation section with a predetermined threshold value.

12. The image processing apparatus according to claim 11, wherein the pixel counting section counts pixels discriminated as not high contrast by the contrast discrimination section among the pixels discriminated as nonedge portions by the edge discrimination section in predetermined peripheral area every category classified by the brightness classification section, and moreover counts the pixels discriminated as high contrast by the contrast discrimination section as the same category as the intermediate brightness pixel.

13. The image processing apparatus according to claim 11, wherein the pixel counting section counts pixels discriminated as not high contrast by the contrast discrimination section among the pixels discriminated as nonedge portions by the edge discrimination section in predetermined peripheral area every category classified by the brightness classification section, counts the pixels discriminated as high contrast by the contrast discrimination section as the same category as the intermediate brightness pixel, and moreover counts the pixels discriminated as edge portions by the edge discrimination section as the same category as the low-brightness pixel.

14. The image processing apparatus according to claim 11, wherein the pixel counting section counts noticed pixel among the pixels discriminated as nonedge portions by the edge discrimination section in predetermined peripheral area every category discriminated by the contrast discrimination section, and moreover every category classified by the brightness classification section.

15. The image processing apparatus according to claim 11, wherein the characteristic-value calculation section and white-ground-region discrimination section set the coefficient of a high-brightness pixel to a positive value and that of an intermediate-brightness pixel to a negative value and calculate the linear sum of the values as a characteristic value, discriminate a white background area when the characteristic value is larger than a predetermined threshold value while setting the coefficient of the high-brightness pixel to a negative value and that of the intermediate-brightness pixel to a positive value, using the linear sum of the values as a characteristic value, and discriminate a white background area when the characteristic value is smaller than a predetermined threshold value.

16. An image processing method for processing a plurality of input color image signals, comprising:
discriminating whether or not pixels in the input image signals are edge portions;
classifying pixels in the input image signals into three categories of high-brightness pixel, intermediate brightness pixel, and low-brightness pixel by comparing brightness values of the pixels with two predetermined threshold values;
discriminating whether or not the pixels in the input image signals are high-contrast portions by comparing the maximum value of brightness differences of the pixels in predetermined peripheral area with a predetermined threshold value;
counting noticed pixel every classified category in accordance with the discrimination result of discriminating whether or not the noticed pixel is the edge portions in predetermined peripheral area and the discrimination result of discriminating whether or not the noticed pixel show the high contrast;
calculating a characteristic value showing the white-ground area likelihood through the linear combination of the counted number of pixels every category; and
discriminating whether or not the noticed pixel is included in a white background area by comparing the calculated characteristic value with a predetermined threshold value.

17. The image processing method according to claim 16, wherein calculation of the characteristic value and discrimination of the white background area are performed by setting the coefficient of a high-brightness pixel to a positive value and that of an intermediate-brightness pixel to a negative value, using the linear sum of the values as a characteristic value, and discriminating a white background area when the characteristic value is larger than a predetermined threshold value while setting the coefficient of the high-brightness pixel to a negative value and that of the intermediate-brightness pixel to a positive value, using the linear sum of the values as a characteristic value, and discriminating a white background area when the characteristic value is smaller than the predetermined threshold value.

* * * * *